(12) United States Patent
Kruglick

(10) Patent No.: US 9,772,990 B2
(45) Date of Patent: Sep. 26, 2017

(54) PERSONAL ASSISTANT CONTEXT BUILDING

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/851,245

(22) Filed: Sep. 11, 2015

(65) Prior Publication Data
US 2016/0004686 A1 Jan. 7, 2016

Related U.S. Application Data

(63) Continuation of application No. 13/991,382, filed as application No. PCT/US2012/068404 on Dec. 7, 2012, now Pat. No. 9,171,092.

(51) Int. Cl.
G06F 17/30 (2006.01)
G06F 17/27 (2006.01)
G06F 9/54 (2006.01)
H04L 12/24 (2006.01)
H04L 29/08 (2006.01)

(52) U.S. Cl.
CPC .......... *G06F 17/2705* (2013.01); *G06F 9/547* (2013.01); *G06F 17/30737* (2013.01); *G06F 17/30867* (2013.01); *G06F 17/30887* (2013.01); *H04L 41/0266* (2013.01); *H04L 67/16* (2013.01); *G06F 17/30893* (2013.01)

(58) Field of Classification Search
None
See application file for complete search history.

(56) References Cited

U.S. PATENT DOCUMENTS 6,535,871 B1 * 3/2003 Romansky ........ G06F 17/30864
7,380,235 B1 5/2008 Fathalla
8,321,792 B1 11/2012 Alur et al.
(Continued)

FOREIGN PATENT DOCUMENTS

WO 2014088588 6/2014

OTHER PUBLICATIONS

Xdadevelopers, "Capture Network Traffic with Andro Shark," accessed at http://www.xda-developers.com/capture-network-traffic-with-andro-shark/, 2 pages (May 6, 2010).
(Continued)

*Primary Examiner* — Hung Q Pham
(74) *Attorney, Agent, or Firm* — Jensen & Puntigam, PS

(57) ABSTRACT

Technologies related to personal assistant context building are generally described. In some examples, network service communications, such as network traffic resulting from the use of mobile applications or "apps" on a mobile device, may be captured, parsed, and included in personal assistant context databases for use in configuring automated personal assistant user interaction operations. In some examples, parsing services may be provided to parse forwarded network service communications and generate converted data for inclusion in personal assistant context databases.

18 Claims, 6 Drawing Sheets

(56) References Cited

U.S. PATENT DOCUMENTS

| | | | |
|---|---|---|---|
| 8,762,156 B2* | 6/2014 | Chen | G10L 15/26 704/10 |
| 2005/0171932 A1 | 8/2005 | Nandhra | |
| 2009/0144609 A1 | 6/2009 | Liang et al. | |
| 2011/0113436 A1 | 5/2011 | Pal et al. | |
| 2012/0016678 A1 | 1/2012 | Gruber et al. | |
| 2012/0084292 A1 | 4/2012 | Liang et al. | |
| 2014/0164400 A1 | 6/2014 | Kruglick | |

OTHER PUBLICATIONS

Seatwave Tickets, accessed at: http://web.archive.org/web/20120131030137/http://itunes.apple.com/us/app/seatwave-tickets/id428499601?mt=8, 2 pages (accessed on Mar. 17, 2015).

"Yappoint," accessed at: http://web.archive.org/web/20121026204629/http://www.programmableweb.com/mashup/yappoint, 2 pages, (Mar. 23, 2012).

Wireshark, "About Wireshark," accessed at https://www.wireshark.org/about.html, 26 pages (May 24, 2013).

Albright, P., "Making money in mobile apps isn't easy: Majority of app developers are moonlighters," accessed at: http://web.archive.org/web/20121113145730/http://www.fiercedeveloper.com/story/making-money-mobile-apps-isnt-easy-majority-app-developers-are-moonlighters/2012-04-16, 6 pages (Apr. 16, 2012).

Baratz, M., "The Evolution of Search: Siri, the "Do" Engine," accessed at http://www.sfweekly.com/shookdown/2010/02/09/the-evolution-of-search-siri-the-do-engine, 4 pages (Feb. 9, 2010).

DuVander, A., "Bing Maps Get More Visual Thanks to Flickr's API," accessed at http://www.programmableweb.com/news/bing-maps-get-more-visual-thanks-to-flickrs-api/2010/03/16, 3 pages (Mar. 16, 2010).

Furui, S., "Speech Recognition Technology in the Ubiquitous/Wearable Computing Environment," IEEE International Conference on Acoustics, Speech, and Signal Processing Proceedings, 4 pages (Jun. 5-Jun. 9, 2000).

International Searching Authority, International Search Report and Written Opinion for PCT/US12/68404, 14 pages (Apr. 19, 2013).

Kritikou, Y., et al., "User Profile Modeling in the Context of Web-Based Learning Management Systems," 37 pages (Nov. 2008).

Programmable Web, Mashups, APIs, and the Web as Platform, 2 pages (Nov. 28, 2012).

Suh, Y., et al., "Context-based User Profile Management for Personalized Services," pp. 64-73, (Jun. 17, 2005).

Tsotsis, Google's Plan to Compete With Apple's Multi-Platform Siri? Google "Assistant", 3 pages (Mar. 2, 2012).

Wimberly, T., "Google's Majel now called Assistant, slated for Q4 launch," accessed at http://androidandme.com/2012/03/applications/googles-majel-now-calledassistant-slated-for-q4-launch/, 22 pages (Mar. 3, 2012).

\* cited by examiner

PERSONAL ASSISTANT CONTEXT BUILDING

CROSS-REFERENCE TO RELATED APPLICATIONS

The present application is a continuation application under 35 U.S.C. §120 of U.S. application Ser. No. 13/991,382, issued as U.S. Pat. No. 9,171,092, entitled "PERSONAL ASSISTANT CONTEXT BUILDING", filed on Jun. 3, 2013. U.S. application Ser. No. 13/991,382 is a U.S. National Stage filing under 35 U.S.C. §371 of International Application No. PCT/US12/68404, entitled "PERSONAL ASSISTANT CONTEXT BUILDING", filed on Dec. 7, 2012. The entire contents of U.S. application Ser. No. 13/991,382 and International Application No. PCT/US12/68404 are incorporated herein by reference.

BACKGROUND

Unless otherwise indicated herein, the materials described in this section are not prior art to the claims in this application and are not admitted to be prior art by inclusion in this section.

Computing devices, particularly mobile devices such as smart phones and tablet devices, are increasingly being equipped with automated personal assistant software. For example, devices equipped with the iOS 5 operating system made by APPLE® Corporation include an automated personal assistant named "Siri". Devices equipped with versions of the Android operating system made by GOOGLE® Corporation include an automated personal assistant referred to as "Voice Actions" or "Google Now". Device users may also choose from a variety of third-party personal assistant applications, which applications may be supplied through digital marketplaces such as those provided by APPLE®, GOOGLE®, and AMAZON®.

The function of personal assistants has been partially demonstrated, however, personal assistants may be improved to achieve greater utility, convenience and power. By way of example, there is an ongoing need in the industry to increase the power, flexibility, and convenience of personal assistants to better serve device users.

SUMMARY

The present disclosure generally describes technologies including devices, methods, and computer readable media relating to personal assistant context building. Some example methods may comprise automated personal assistant methods performed by computing devices, e.g., by mobile devices equipped with automated personal assistants. Example methods may include a data collection and database configuration stage, and a user interaction stage. In the data collection and database configuration stage, a computing device may detect a network service communication; obtain parsed personal assistant data extracted from the network service communication; and/or store the parsed personal assistant data in a personal assistant context database. The computing device may adjust relative weights of relationships between the parsed personal assistant data stored in the personal assistant context database, for example by strengthening weights of relationships between the parsed personal assistant data extracted from the network service communication.

In the user interaction stage, the computing device may receive an automated personal assistant user input; determine strong weighted relationships between the received user input and other personal assistant data in the personal assistant context database; and configure a user interaction operation using personal assistant data having the strong weighted relationships.

Some example methods may comprise providing a parsing service. Example methods may be carried out by a network server. The network server may receive from a computing device a copy of a network service communication, and parse data extracted from the network service communication to generate parsed personal assistant data. In parsing the network service communication, the network server may, for example, maintain a network service library including service translation information for a plurality of network services; identify service translation information in the network service library for the network service corresponding to the network service communication; and convert data extracted from the network service communication using the identified service translation information. The network server may include the converted data in the parsed personal assistant data and send the parsed personal assistant data to the computing device.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may comprise a processor, a memory, and an automated personal assistant configured to carry out the methods described herein. Example network servers may comprise a processor, a memory, and a parsing service configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
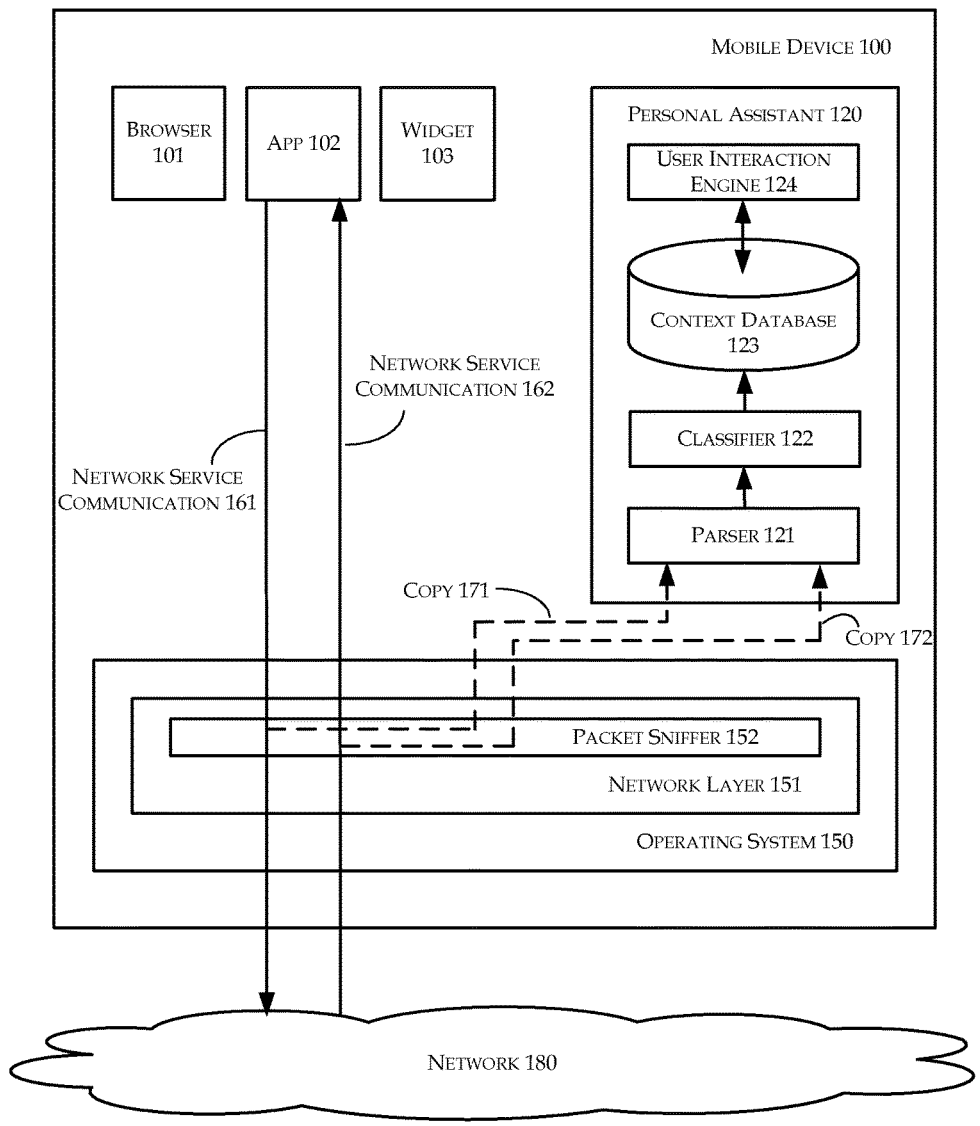
FIG. 1 is a block diagram illustrating an example computing device configured for personal assistant context building.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to personal assistant context building. In some examples, network service communications, such as network traffic resulting from the use of mobile applications or "apps" on a mobile device, may be captured, parsed, and included in personal assistant context databases for use in configuring automated personal assistant user interaction operations. In some examples, parsing services may be provided to parse forwarded network service communications and to generate converted data for inclusion in personal assistant context databases.

In some embodiments, personal assistant context building may provide value to interpret the meaning of received user inputs, such as voice commands, by personal assistants. The terms "user input" and "personal assistant user input" are used interchangeably herein, and refer to inputs to a personal assistant unless otherwise indicated. User inputs may take the form of spoken voice commands or inquiries, although other user input types, such as text entries via a keyboard, are also possible as will be appreciated. For example, a mobile device user may ask a personal assistant, "Where is the starting line for the half-marathon?" Absent context information, it may be difficult or impossible for the personal assistant to provide a meaningful response to the user input. The personal assistant would not "know" which half marathon the user is interested in. As a result, the personal assistant may throw an error, or may require the user to answer additional questions to establish the missing information. The mobile device context is used in this example with the understanding that the technologies described herein may be adapted for any computing devices equipped with personal assistants.

At least partial context information may be gathered from network traffic involving apps installed on the mobile device. For example, the user in the example above may have recently used an app provided by a race information service, such as the "Active.com" app made by Active Network, Inc.®, to look up the La Jolla half marathon on Apr. 28, 2013. Information from network service communications by the Active.com app may be stored in the mobile device's personal assistant context database.

By including information from network service communications involving apps installed on the mobile device in the mobile device's personal assistant context database, the personal assistant may have sufficient context to accurately configure satisfactory automated personal assistant user interaction operations responsive to received user inputs. The terms "user interaction operation" and "personal assistant user interaction operation" are used interchangeably herein, and refer to outputs by a personal assistant, or actions performed by a personal assistant which are perceptible to the user. User interaction operations may "interact" with the user for example by providing information to the user and/or soliciting further input from the user. For example, some user interaction operations may comprise audible speech outputs. Some user interaction operations may comprise questions asking the user for additional input. Some user interaction operations may comprise visual displays such as map interfaces, photographs, web pages, or telephone keypad interfaces that may be preconfigured for dialing one or more contacts.

For example, in response to the above example "Where is the starting line for the half-marathon?" user input, a personal assistant may use context information from the Active.com app network service communications to determine that the user input likely refers to the La Jolla half marathon on Apr. 28, 2013. The personal assistant may then, for example, determine the event location, e.g., the starting line for the race of interest, and the personal assistant may configure a user interaction operation comprising a display of an address or map interface, or an audible speech output or response comprising the event location. Alternatively, the personal assistant may configure a user interaction operation comprising a question such as, "Do you mean the location of the La Jolla half marathon on Apr. 28, 2013?"

Context information is not necessarily needed in connection with all personal assistant user inputs. Some user inputs, such as a voice command, "call Bob", may be unambiguous and may be executed by personal assistants without consulting a personal assistant context database. However, context may be beneficial in connection with configuring user interaction operations responsive to many personal assistant user inputs. Configuring user interaction operations responsive to even seemingly unambiguous user inputs such as "call Bob" may in some cases benefit from consulting context information, e.g., when there are multiple contacts named "Bob" among the mobile device user's contacts.

In some embodiments, personal assistants may attain an increased level of situational and context awareness by observing network service communications, such as Application Programming Interface (API) calls and responses. The network service communications may comprise network communications between apps and/or web pages loaded on a mobile device, and off-device network nodes, such as network servers hosting network APIs and/or other network services with which the on-device apps and/or web pages may communicate. The network service communications may be interpreted and stored in a personal assistant context database, optionally among other context information that may be gathered from other sources for inclusion in personal assistant context databases.

Embodiments of this disclosure need not rely upon active cooperation from apps installed on the mobile device, such as apps that may be configured to cooperate by entering relevant data into a central repository, e.g., central calendars or address books. Solutions presented herein may also provide more information than might be obtained through active cooperation, by including information related to inconclusive user activities, such as information identifying products, events, activities, locations, or other items that are investigated through an app or webpage, and are therefore identified in API calls and responses, or other network service communications, but which products, events, activities, locations, or other items may not have been purchased, registered, flagged or otherwise subject to interactions that may trigger cooperative action by a cooperating app.

Large numbers of web based APIs are currently available and used by apps and mobile-enabled web pages. By way of example, travel APIs enable research and purchase of airfare, hotel rooms, and car rental. Social network APIs enable posting of photos, status updates, messaging, establishing connections and the like. Location based APIs allow retrieval of maps, restaurants, bus stops, real estate listings, weather forecasts, or any of a huge variety of other location-based information. Email APIs enable reading, composing and sending email. Calendar APIs enable making and checking calendar entries, sending invitations to other participants, and the like. Event APIs enable research and purchase of event tickets. Small businesses use web APIs to enable customers to schedule appointments. These APIs are the building blocks of the modern programmable web. One programmer web site, provided by ProgrammableWeb.com, recently listed information on 8045 different web accessible APIs. In many cases, apps and mobile-enabled web pages may comprise a front end for a cluster of web API calls, and may perform API calls in connection with many of their operations. As a result, network service communications such as API calls and responses present a potentially large source of information that may be useful for establishing personal assistant context information.

In some embodiments, computing devices may be equipped with a packet sniffer that detects network service communications, a parser to parse the network service communications, and a classifier to classify the network service communications in a personal assistant context database. Technologies disclosed herein may use the packet sniffer, parser, and classifier in a data collection and database configuration stage, to configure personal assistant context databases. Personal assistants may then make use of the personal assistant context databases in a user interaction stage, wherein personal assistant context databases may be used to determine context for user interaction operations.

In some embodiments, the packet sniffer may be configured in a network layer of a device operating system. The packet sniffer may be configured to detect network service communications, e.g., by analyzing network traffic for API calls. API calls may be identified, for example, by detecting network traffic comprising http post and get calls with command and option fields, by detecting network traffic comprising API key fields, by detecting network traffic comprising API destinations, by detecting format tags such as JSON or XML format tagging markers, by detecting communications with known APIs, by packet fingerprint or structural analysis, and/or using any other technique to detect network service communications. The packet sniffer may also be configured to detect responses from API calls, e.g., responses in Extensible Markup Language (XML) or JavaScript Object Notation (JSON) format. The packet sniffer may alternatively or additionally be configured to detect any other types of network service communications, whether API communications or otherwise. The packet sniffer may be configured to forward copies of detected network service communications to the parser.

In some embodiments, parsers may be configured within computing devices, e.g., as a component of a personal assistant on a mobile device. Parsers may be configured to parse copies of network service communications. Parsers may, for example, remove data from network service communications that is not relevant or cannot be used for personal assistant context building. Parsers may, for example, group data from network service communications into contextual groups for personal assistant context building. Parsers may, for example, convert data from network service communications into another form by inserting or modifying data in parsed personal assistant data to improve data utility as context building information. Parsers may be configured to store parsed personal assistant data in personal assistant context databases, or to otherwise temporarily store parsed personal assistant data for further processing, e.g., by classifiers as described herein, wherein the further processing may eventually store parsed personal assistant data in personal assistant context databases.

In embodiments in which obtaining parsed personal assistant data comprises parsing network service communications by computing devices, e.g., by a parser in a personal assistant on a mobile device as introduced above, computing devices may be configured to convert parsed personal assistant data into another form, e.g., into a form that is designed for use in the personal assistant context database. Example approaches may include identifying service translation information for a network API corresponding to the network service communication to be parsed; converting data extracted from the network service communication using the identified service translation information to produce converted data; and including the converted data in the parsed personal assistant data.

In some embodiments, computing devices may be configured to maintain a network API library including service translation information for a plurality of network APIs, for use in identifying service translation information for network APIs corresponding to particular network service communications. In some embodiments, computing devices may be configured to connect to a network API library service to retrieve service translation information for network APIs corresponding to particular network service communications.

In some embodiments, computing devices may be configured to access a parsing service via a network connection, e.g., a parsing service configured as a cloud service. In such embodiments, computing devices may be configured to obtain parsed personal assistant data by forwarding copies of network service communications to the remote parsing service, and subsequently receiving parsed personal assistant data returned from remote parsing service. Remote parsing services may be configured, for example, to receive copies of network service communications, such network service requests and/or network service responses, and to parse data extracted from the received network service communications to generate parsed personal assistant data. Parsing services may be configured to send parsed personal assistant data to computing devices for application in personal assistant context databases, e.g., either by returning parsed personal assistant data to the device that originally forwarded a network service communication, or by delivering parsed personal assistant data to a cloud-based personal assistant context database.

In some embodiments, parsing services may be configured to convert data into another form, e.g., into a form that is designed for use in personal assistant context databases, as described above. A parsing service may, for example, maintain a network service library including service translation information for a plurality of network services; identify service translation information in the network service library for a network service corresponding to a particular network service communication; convert data extracted from the network service communication using the identified service translation information to produce converted data; and include the converted data in parsed personal assistant data that is returned to a mobile device.

In some embodiments, classifiers may be configured to classify network service communications in personal assistant context databases, e.g., by adjusting relative weights of relationships between (among) parsed personal assistant data stored in personal assistant context databases. The adjusting may comprise strengthening weights of relationships between (among) parsed personal assistant data extracted from a network service communication, relative to other relationships between (among) personal assistant data in the personal assistant context database. For example, if a network service communication included the terms "La Jolla" and "half-marathon", a relationship weight between (among) these terms may be strengthened relative to relationship weights between (among) other terms that may not have been included in the network service communication.

In some embodiments, classifiers may be configured within computing devices, e.g., as a component of a personal assistant on a mobile device. In some embodiments, remote parsing services such as those described above may include classifiers that perform at least some classification functions. Remote parsing service classifiers may be configured to classify data from network service communications received from mobile devices, and to include classification information such as relative weights of relationships between the parsed personal assistant data, or classification adjustment deltas, in parsed personal assistant data that is returned to mobile devices. For example, parsing services may be configured to determine relative weights of relationships between parsed personal assistant data, to include the relative weights of relationships in the parsed personal assistant data, and to send the parsed personal assistant data including relative weights of relationships to mobile devices for incorporation into personal assistant context databases. Parsing services may alternatively send the parsed personal assistant data including relative weights of relationships to a cloud-based personal assistant context database. Mobile devices or cloud-based personal assistant context databases may be configured to include received parsed and classified parsed personal assistant data in personal assistant context databases, and optionally to adjust relationship weights according to classification adjustment deltas.

Personal assistants may make use of personal assistant context databases in a user interaction stage, wherein personal assistant context databases may be used to determine context for user interaction operations. For example, personal assistants may be configured to receive an automated personal assistant user input, e.g., a voice input such as the example question, "Where is the starting line for the half-marathon?" described above. Text or other inputs may also be received, depending on personal assistant capabilities. Personal assistants may be configured to use context information to configure an automated personal assistant user interaction operation, based on the received user input. For example, personal assistants may be configured to use context information to determine which half marathon is intended by the user, to configure an automated personal assistant user interaction operation in which a map interface to the event location is displayed.

Using context information to configure an automated personal assistant user interaction operation may comprise, for example, determining, using a received user input and a personal assistant context database, one or more strong weighted relationships between the received user input and other personal assistant data in the personal assistant context database; and configuring an automated personal assistant user interaction operation using personal assistant data in the personal assistant context database having the one or more strong weighted relationships with the user input.

In some embodiments, using a personal assistant context database may comprise interacting with a context database that is maintained locally at a computing device comprising the personal assistant. In some embodiments, using a personal assistant context database may comprise interacting with a cloud-based context database that is maintained by a personal assistant network service.

In some embodiments, configuring the automated personal assistant user interaction operation may comprise configuring an internet search, e.g., configuring a search for information on the event location for the La Jolla half-marathon. In some embodiments, configuring the automated personal assistant user interaction operation may comprise configuring a voice interaction with the mobile device user, e.g., configuring a question such as "Are you requesting the location of the La Jolla half marathon?" Of course, user interaction operations may comprise a wide variety of actions such as placing a call, sending a text message, posting information to a social network, displaying requested information, retrieving driving directions, or any of a wide variety of other possible user interaction operations. Any action performed by a personal assistant in response to a user input may be considered a "personal assistant user interaction operation" herein.

FIG. 1 is a block diagram illustrating an example computing device configured for personal assistant context building, arranged in accordance with at least some embodiments of the present disclosure. FIG. 1 includes a mobile device 100 and a network 180. Mobile device 100 includes a browser 101, an app 102, a widget 103, a personal assistant 120, and an operating system 150. Personal assistant 120 includes a parser 121, a classifier 122, a context database 123 and a user interaction engine 124. Operating system 150 includes a network layer 151, and network layer 151 includes a packet sniffer 152.

FIG. 1 illustrates transmission of a network service communication 161 from app 102 to network 180, via operating system 150 and network layer 151. Also illustrated is transmission of a network service communication 162 from network 180 to app 102, also via operating system 150 and network layer 151. A copy 171 of network service communication 161 is illustrated as forwarded by packet sniffer 152 to parser 121. A copy 172 of network service communication 162 is also illustrated as forwarded by packet sniffer 152 to parser 121. An arrow from parser 121 to classifier 122 indicates consumption by classifier 122 of data output from parser 121. An arrow from classifier 122 to context database 123 indicates insertion of data output from classifier 122 into context database 123. A two-way arrow between user interaction engine 124 and classifier 122 indicates lookups by user interaction engine 124 in context database 123, e.g., to determine context of received user inputs for configuration of personal assistant user interaction operations.

In FIG. 1, browser 101, app 102, and widget 103 are examples of applications that may execute on mobile device.

FIG. 1 illustrates network service communications 161 and 162 by app 102 for simplicity of illustration, however, it will be appreciated that browser 101, widget 103, or any other application capable of sending and receiving network service communications may be subject to the context building technologies described herein. Nonetheless, some embodiments may distinguish between different types of applications, and may be applied to some types of applications, or some application communications, while excluding other types of applications or communications. For example, in some embodiments, the context building technologies disclosed herein may be directed to network service communications by apps such as app 102 and not to network service communications by browser 101 or widget 103. Embodiments may for example turn packet sniffer 152 on or off based on which of applications 101, 102, or 103 is controlling mobile device 100, or may configure packet sniffer to detect network service communications having properties corresponding to apps such as app 102, and not to detect network service communications having properties corresponding to browser 101 or widget 103.

A "network service communication" is defined herein as a programmatic access to an automated network service, the automated network service configured to provide an automatic response to such programmatic access, or the automated network service response to such programmatic access. A network API, implemented for example by a computing device within network 180, is an example of an automated network service. A network API call is an example of a network service communication, in the form of a network service request. A network API response is another example of a network service communication, in the form of a network service response.

Information from an example API call made by an active.com widget, and captured to serve herein as an example network service communication is provided below:

```
GET /resource/assetservice/asset/3a1b52e7-9d67-42f2-9bb8-f4c624a0d280?api_key=
[deleted api key] HTTP/1.1
    Host: api.amp.active.com
    Connection: keep-alive
    Cache-Control: max-age=0
```

It will be appreciated that the above provides one of many possible examples, and different information may be included in different network service communications.

Information from an example communication session, following the above initial API call made by an active.com widget, and including various API calls and API responses captured to serve as further example network service communications, is provided below:

```
HTTP/1.1 200 OK
Accept-Ranges: bytes
Content-Type: application/xml
Date: Mon, 16 Apr 2012 20:16:01 GMT
Server: Noelios-Restlet-Engine/1.1.m4
Vary: Accept-Charset, Accept-Encoding, Accept-Language, Accept
X-Mashery-Responder: proxylb-p-us-east-1d-14.mashery.com
X-Powered-By: Servlet 2.4; JBoss-4.0.4.GA (build: CVSTag=JBoss_4_0_4_GA date=
200605151000)/Tomcat-5.5
Content-Length: 8172
Connection: keep-alive
<?xml version="1.0" encoding="UTF-8" standalone="yes"?>
<event><longitude>-117.2588</longitude>
<latitude>32.84334</latitude>
<category>Activities</category>
<dma>San Diego</dma>
<activeAdvantage>true</activeAdvantage>
<seoUrl>http://www.active.com/running/la-jolla-ca/la-jolla-half-marathon-
2010</seoUrl>
<assetID>3A1B52E7-9D67-42F2-9BB8-F4C624A0D280</assetID>
<eventID>1733302</eventID>
<eventDetailsPageUrl>http://www.active.com/page/Event_Details.htm?event_id=173330
2&assetId=3A1B52E7-9D67-42F2-9BB8-F4C624A0D280</eventDetailsPageUrl>
<mediaTypes><mediaType>Event</mediaType>
<mediaType>Event\5K</mediaType>
<mediaType>Event\Half Marathon</mediaType></mediaTypes>
<eventContactEmail></eventContactEmail>
<eventContactPhone></eventContactPhone>
<eventName>La Jolla Half Marathon</eventName>
<eventDate>2010-04-25T07:30:00-07:00</eventDate>
<eventLocation>Del Mar to La Jolla</eventLocation>
<eventAddress>Starts at the Del Mar Fairgrounds - Finishes at La Jolla
Cove</eventAddress>
<eventCity>La Jolla</eventCity>
<eventState>California</eventState>
<eventZip>92037</eventZip>
<eventCountry>USA</eventCountry>
<usatSanctioned>false</usatSanctioned>
```

```
<regOnline>true</regOnline>
<eventCloseDate>2010-04-10T23:59:00-07:00</eventCloseDate>
<eventFees>Half Marathon $55.00 until 2/5 and $65 after<br>5K (Run &
Stride) $25.00</eventFees>
<currencyCode>USD</currencyCode>
<eventTypeID>7</eventTypeID>
<eventType>Event, Race</eventType>
<hasEventResults>true</hasEventResults>
<hasMetaResults>true</hasMetaResults>
<showMap>true</showMap>
<eventContactEmail></eventContactEmail>
<eventContactPhone></eventContactPhone>
<displayCloseDate>true</displayCloseDate>
<excludedFromEmailing>true</excludedFromEmailing>
<metaEventName>La Jolla Half Marathon</metaEventName>
<metaEventID>1065</metaEventID>
<regFunnel>regcenter_6</regFunnel>
<isValid>true</isValid>
<displayRegistration>true</displayRegistration>
<metaEvents>
<event><assetID>83F94ED0-2564-4201-BF83-C7E339559088</assetID>
<eventID>1855672</eventID>
<eventDetailsPageUrl>http://www.active.com/page/Event_Details.htm?event_id=1855672</eventDetailsPageUrl>
<eventName>La Jolla Half Marathon 2011</eventName>
<eventDate>2011-04-17T07:30:00-07:00</eventDate></event>
<event><assetID>F7A3875B-43BC-440F-B466-E5FC0D22EF93</assetID>
<eventID>1573877</eventID>
<eventDetailsPageUrl>http://www.active.com/page/Event_Details.htm?event_id=1573877</eventDetailsPageUrl>
<eventName>La Jolla Half Marathon</eventName>
<eventDate>2009-04-26T07:30:00-07:00</eventDate></event>
<event><assetID>A6AD55E7-D10F-42D7-BFBF-C2F923785D89</assetID>
<eventID>1440796</eventID>
<eventDetailsPageUrl>http://www.active.com/page/Event_Details.htm?event_id=1440796</eventDetailsPageUrl>
<eventName>La Jolla Half Marathon</eventName>
<eventDate>2008-04-27T07:30:00-07:00</eventDate></event>
<event><eventID>1317339</eventID>
<eventDetailsPageUrl>http://www.active.com/page/Event_Details.htm?event_id=1317339</eventDetailsPageUrl>
<eventName>La Jolla Half Marathon</eventName>
<eventDate>2007-04-22T07:30:00-07:00</eventDate></event>
<event><eventID>1260777</eventID>
<eventDetailsPageUrl>http://www.active.com/page/Event_Details.htm?event_id=1260777</eventDetailsPageUrl>
<eventName>La Jolla Half Marathon</eventName>
<eventDate>2006-04-23T07:30:00-07:00</eventDate></event>
<event><eventID>1145662</eventID>
<eventDetailsPageUrl>http://www.active.com/page/Event_Details.htm?event_id=1145662</eventDetailsPageUrl>
<eventName>La Jolla Half Marathon</eventName>
<eventDate>2005-04-24T07:30:00-07:00</eventDate></event>
<event><eventID>1091319</eventID><eventDetailsPageUrl>http://www.active.com/page/Event_Details.htm?event_id=1091319</eventDetailsPageUrl>
<eventName>La Jolla Half Marathon</eventName>
<eventDate>2004-04-25T00:00:00-07:00</eventDate>
<eventTime>All events start at 7:30am</eventTime></event>
<event><assetID>221CA4B5-0E93-4838-82B1-C179F017DA05</assetID>
<eventID>1024643</eventID>
<eventDetailsPageUrl>http://www.active.com/page/Event_Details.htm?event_id=1024643</eventDetailsPageUrl>
<eventName>La Jolla Half Marathon</eventName>
<eventDate>2003-04-27T07:30:00-07:00</eventDate>
<eventTime>All events start at 7:30am</eventTime></event>
<event><assetID>92D360E2-4E47-4880-A74B-7DB47695F932</assetID>
<eventID>970413</eventID>
<eventDetailsPageUrl>http://www.active.com/page/Event_Details.htm?event_id=970413
</eventDetailsPageUrl>
<eventName>La Jolla Half Marathon</eventName>
<eventDate>2002-04-28T00:00:00-07:00</eventDate>
<eventTime>All events start at 7:30am</eventTime></event>
<event><assetID>F1DBDA8B-001D-4053-87AD-BD6E12FC5DE8</assetID>
<eventID>954661</eventID>
<eventDetailsPageUrl>http://www.active.com/page/Event_Details.htm?event_id=954661
</eventDetailsPageUrl>
<eventName>La Jolla Half Marathon</eventName>
<eventDate>2001-04-29T00:00:00-07:00</eventDate>
<eventTime>7:30 AM</eventTime></event>
```

-continued

```
<event><assetID>4502518F-0AFB-427F-9B1F-0E642BB7736E</assetID>
<eventID>142410</eventID>
<eventDetailsPageUrl>http://www.active.com/page/Event_Details.htm?event_id=142410
</eventDetailsPageUrl>
<eventName>18th Annual La Jolla Half Marathon</eventName>
<eventDate>2000-04-30T00:00:00-07:00</eventDate></event>
<event><assetID>469BFB47-343C-4EFD-B931-2CAABAED9C1A</assetID>
<eventID>144</eventID>
<eventDetailsPageUrl>http://www.active.com/page/Event_Details.htm?event_id=144</e
ventDetailsPageUrl>
<eventName>La Jolla Half Marathon</eventName>
<eventDate>1998-04-26T00:00:00-07:00</eventDate></event>
</metaEvents>
<channels><channel><channelName>Running</channelName>
<primaryChannel>true</primaryChannel></channel></channels>
<eventDetails/><eventDonationLinks/><eventSanctions/>
<eventCategories>
<eventCategory><categoryID>1190363</categoryID>
<categoryGroupCount>0</categoryGroupCount>
<categoryName>La Jolla Half Marathon</categoryName>
<categoryType>1</categoryType>
<categoryOrder>1</categoryOrder>
<numRegistered>6595</numRegistered>
<maxRegistrations>6596</maxRegistrations>
<percentFull>99.98483929654336</percentFull>
<displayDate>2009-04-26T08:00:00-07:00</displayDate>
<closeDate>2010-04-10T23:59:00-07:00</closeDate>
<actualCloseDate>2010-04-10T23:59:00-07:00</actualCloseDate>
<isExpired>true</isExpired>
<priceChanges><priceChange>
<price>55.0</price>
<priceChange>65.0</priceChange>
<priceUntilDate>2010-02-05T23:59:00-08:00</priceUntilDate></priceChange>
<priceChange><price>65.0</price>
<priceUntilDate>2010-04-10T23:59:00-07:00</priceUntilDate></priceChange>
</priceChanges></eventCategory>
<eventCategory><categoryID>1190364</categoryID>
<categoryGroupCount>0</categoryGroupCount>
<categoryName>La Jolla Shores 5k</categoryName>
<categoryType>1</categoryType>
<categoryOrder>2</categoryOrder>
<numRegistered>1108</numRegistered>
<maxRegistrations>1800</maxRegistrations>
<percentFull>61.55555555555555</percentFull>
<displayDate>2009-04-26T08:00:00-07:00</displayDate>
<closeDate>2010-04-10T23:59:00-07:00</closeDate>
<actualCloseDate>2010-04-10T23:59:00-07:00</actualCloseDate>
<isExpired>true</isExpired>
<priceChanges><priceChange><price>25.0</price>
<priceChange>30.0</priceChange>
<priceUntilDate>2010-02-05T23:59:00-08:00</priceUntilDate></priceChange>
<priceChange><price>30.0</price>
<priceUntilDate>2010-04-10T23:59:00-07:00</priceUntilDate></priceChange>
</priceChanges></eventCategory>
<eventCategory><categoryID>1190365</categoryID>
<categoryGroupCount>0</categoryGroupCount>
<categoryName>Major Sponsor (Password Required)</categoryName>
<categoryType>1</categoryType>
<categoryOrder>4</categoryOrder>
<numRegistered>3</numRegistered>
<maxRegistrations>25</maxRegistrations>
<percentFull>12.0</percentFull>
<displayDate>2009-04-22T10:08:06.523-07:00</displayDate>
<closeDate>2010-02-10T23:59:00-08:00</closeDate>
<actualCloseDate>2010-02-10T23:59:00-08:00</actualCloseDate>
<isExpired>true</isExpired>
<priceChanges><priceChange>
<price>0.0</price>
<priceUntilDate>2010-02-10T23:59:00-08:00</priceUntilDate></priceChange>
</priceChanges></eventCategory>
</eventCategories>
<eventUrl>http://www.lajollahalfmarathon.com</eventUrl>
<registrationSearchUrl>http://www.active.com/search_reg.cfm?event_id=1733302&
;sr_id=25508</registrationSearchUrl>
http://results.active.com/pages/page.jsp?pubID=3&eventID=1733302</
resultsUrl>
<eventContactUrl>http://www.active.com/event_contact.cfm?event_id=1733302</event
ContactUrl></event>
```

Again, it will be appreciated that the above provides some of many possible examples, and different information may be included in different network service communications.

Network service communications may be detected by packet sniffer 152. Packet sniffer 152 may be configured within network layer 151 of operating system 150, as shown, or packet sniffer 152 may be configured at any other location within mobile device 100 from which packet sniffer 152 can analyze network traffic to detect network service communications.

In some embodiments, packet sniffer 152 may be configured to distinguish between network service communications 161 and 162 and other communication types, such as voice communications transmitted when mobile device 100 is used as a telephone. It will be appreciated that packet sniffer 152 may use any of a variety of techniques to detect network service communications 161 and 162. In some embodiments, packet sniffer 152 may analyze communications to detect whether communications include properties that are unique to, or are typical of, network service communications 161 and 162. Communications having properties that are unique to, or are typical of, network service communications may be copied and forwarded to parser 121. For example, in some embodiments, packet sniffer 152 may be configured to inspect network traffic for the presence of one or more of: http post and/or get calls with command and option fields, API key fields, API destination information, XML formatted data, and/or JSON formatted data. Packet sniffer 152 may be configured to treat communications having such properties as network service communications by forwarding copies, such as copies 171 and 172, to parser 121.

Parser 121, classifier 122 and context database 123 may be configured in personal assistant 120, as illustrated in FIG. 1, or elsewhere in mobile device 100, e.g., in operating system 150. Parser 121 and classifier 122 may be configured with varying levels of power and corresponding complexity, ranging from relatively simple embodiments to more powerful and complex embodiments. Parser 121 and classifier 122 may also be combined in some embodiments.

Parser 121 may generally be configured to operate locally at mobile device 100, and/or to outsource some or all of its tasks to a parsing service that may be available via network 180. Local parser operations are described below. Embodiments configured to access parsing services are described in connection with FIG. 3, devices implementing parsing services are described in connection with FIG. 7, and methods for providing parsing services are described in connection with FIG. 8. In general, parser 121 may include similar features to parsing services described in connection with FIG. 3, FIG. 7, and FIG. 8, and vice-versa. Embodiments may deploy parser functions locally at mobile device 100 or remotely in a parsing service according to design selections made for particular implementations.

Parser 121 may be configured to modify network service communication data from a received copy, such as copy 171 or copy 172, for storage in context database 123. Parser 121 may be configured to remove aspects of network service communication data, group aspects of network service communication data, and/or convert aspects of network service communication data as described herein. While parser 121 is illustrated as a single component in FIG. 1, it will be appreciated that parser 121 may include multiple components. For example, in some embodiments, parser 121 may comprise an XML parser, a JSON parser, and/or parsers for other types of network service communications as appropriate.

In embodiments in which parser 121 removes aspects of network service communication data, parser 121 may for example identify aspects of network service communication data that may include valuable content for context database 123, and may remove other aspects of network service communication data. For example, with regard to the below example section of a network service communication:

```
HTTP/1.1 200 OK
Accept-Ranges: bytes
Content-Type: application/xml
Date: Mon, 16 Apr 2012 20:16:01 GMT
Server: Noelios-Restlet-Engine/1.1.m4
Vary: Accept-Charset, Accept-Encoding, Accept-Language, Accept
X-Mashery-Responder: proxylb-p-us-east-1d-14.mashery.com
X-Powered-By: Servlet 2.4; JBoss-4.0.4.GA (build:
CVSTag=JBoss_4_0_4_GA date=
200605151000)/Tomcat-5.5
Content-Length: 8172
Connection: keep-alive
<?xml version="1.0" encoding="UTF-8" standalone="yes"?>
<event><longitude>-117.2588</longitude>
<latitude>32.84334</latitude>
<category>Activities</category>
<dma>San Diego</dma>
<activeAdvantage>true</activeAdvantage>
<seoUrl>http://www.active.com/running/la-jolla-ca/la-jolla-half-marathon-
2010</seoUrl>
<assetID>3A1B52E7-9D67-42F2-9BB8-F4C624A0D280</assetID>
<eventID>1733302</eventID>
```

Parser 121 may be configured to remove header information, strings of unrecognized letters numbers and letters, and certain XML data designated as typically of little context value, to produce a parsed output such as the following:

```
event
longitude [-117.2588]
latitude [32.84334]
category [activities]
dma [San Diego]
activeAdvantage [true]
seoUrl
[http://www.active.com/running/la-jolla-ca/la-jolla-half-marathon-2010]
```

Parsing techniques in particular implementations may retain or discard virtually any data from network service communications, as will be appreciated. In some embodiments parser 121 may be configured to identify and remove aspects of network service communication data that are unlikely to include valuable content for context database 123, and to retain other aspects of network service communication data. Parser 121 may be configured to store parsed data in context database 123 and/or to supply parsed data to classifier 122 for further processing.

In embodiments in which parser 121 groups aspects of network service communication data, parser 121 may, for example, identify repeating patterns of data and/or different logical segments of network service communication data, and parser 121 may establish multiple groups of data to be stored in context database 123. For example, with regard to the below example section of a network service communication:

```
<eventCategories>
<eventCategory><categoryID>1190363</categoryID>
<categoryGroupCount>0</categoryGroupCount>
<categoryName>La Jolla Half Marathon</categoryName>
<categoryType>1</categoryType>
<categoryOrder>1 </categoryOrder>
<numRegistered>6595</numRegistered>
<maxRegistrations>6596</maxRegistrations>
<percentFull>99.98483929654336</percentFull>
<displayDate>2009-04-26T08:00:00-07:00</displayDate>
<closeDate>2010-04-10T23:59:00-07:00</closeDate>
<actualCloseDate>2010-04-10T23:59:00-07:00</actualCloseDate>
<isExpired>true</isExpired>
<priceChanges><priceChange>
<price>55.0</price>
<priceChange>65.0</priceChange>
<priceUntilDate>2010-02-05T23:59:00-08:00</priceUntilDate></priceChange>
<priceChange><price>65.0</price>
<priceUntilDate>2010-04-10T23:59:00-07:00</priceUntilDate></priceChange>
</priceChanges></eventCategory>
<eventCategory><categoryID>1190364</categoryID>
<categoryGroupCount>0</categoryGroupCount>
<categoryName>La Jolla Shores 5k</categoryName>
<categoryType>1</categoryType>
<categoryOrder>2</categoryOrder>
<numRegistered>1108</numRegistered>
<maxRegistrations>1800</maxRegistrations>
<percentFull>61.55555555555555</percentFull>
<displayDate>2009-04-26T08:00:00-07:00</displayDate>
<closeDate>2010-04-10T23:59:00-07:00</closeDate>
<actualCloseDate>2010-04-10T23:59:00-07:00</actualCloseDate>
<isExpired>true</isExpired>
<priceChanges><priceChange><price>25.0</price>
<priceChange>30.0</priceChange>
<priceUntilDate>2010-02-05T23:59:00-08:00</priceUntilDate></priceChange>
<priceChange><price>30.0</price>
<priceUntilDate>2010-04-10T23:59:00-07:00</priceUntilDate></priceChange>
</priceChanges></eventCategory>
```

Parser 121 may be configured to identify repetition of multiple <eventCategory> sections, as well as to remove data as described above, to produce a parsed output such as the following:

| eventCategories |
| --- |
| GROUP 1 |
| eventCategory categoryID [1190363]<br>categoryGroupCount [0]<br>categoryName [La Jolla Half Marathon]<br>categoryType [1]<br>categoryOrder [1]<br>numRegistered [6595]<br>maxRegistrations [6596]<br>percentFull [99.98483929654336]<br>displayDate [2009-04-26T08:00:00-07:00]<br>closeDate [2010-04-10T23:59:00-07:00]<br>actualCloseDate [2010-04-10T23:59:00-07:00]<br>isExpired trueprice [55.0]<br>priceChange [65.0]<br>priceUntilDate [2010-02-05T23:59:00-08:00]<br>priceChange price [65.0]<br>priceUntilDate [2010-04-10T23:59:00-07:00] |
| GROUP 2 |
| eventCategory categoryID [1190364]<br>categoryGroupCount [0]<br>categoryName [La Jolla Shores 5k]<br>categoryType [1]<br>categoryOrder [2]<br>numRegistered [1108]<br>maxRegistrations [1800]<br>percentFull [61.55555555555555]<br>displayDate [2009-04-26T08:00:00-07:00]<br>closeDate [2010-04-10T23:59:00-07:00] |

-continued

| eventCategories |
| --- |
| actualCloseDate [2010-04-10T23:59:00-07:00]<br>isExpired [true]<br>priceChanges priceChange price [25.0]<br>priceChange [30.0]<br>priceUntilDate [2010-02-05T23:59:00-08:00]<br>priceChange price [30.0]<br>priceUntilDate [2010-04-10T23:59:00-07:00] |

Parsing techniques in particular implementations may group data from network service communications according to virtually any grouping rules, as will be appreciated. As noted above, parser 121 may be configured to store parsed data in context database 123 and/or to supply parsed data to classifier 122 for further processing.

In embodiments in which parser 121 converts aspects of network service communication data, parser 121 may be configured to use service translation information to convert data. For example, parser 121 may access a network service library that contains service translation information for multiple network services, such as multiple network APIs, to retrieve service translation for a network service/network API identified in a received copy of a network service communication. For example, the above example API call lists a host as "api.amp.active.com". This or any other information as appropriate may be used to look up a network service, such as a network API, in a network service library. Service translation information may provide, e.g., a list of typical terms used in connection with the network service, and corresponding translation outputs and/or handling instructions. For example, service translation information for api.amp.active.com may provide:

```
eventCategory = [instruction: delete line]
categoryGroupCount = [instruction: delete line]
categoryName = race and run and event
categoryType = [instruction: delete line]
categoryOrder = [instruction: delete line]
numRegistered = [instruction: delete line]
maxRegistrations = [instruction: delete line]
percentFull = [instruction: delete line]
displayDate = event date [instruction: include first 10 characters]
closeDate = [instruction: delete line]
actualCloseDate = [instruction: delete line]
*price* = [instruction: delete line]
```

Parser 121 may be configured to use service translation information such as the above to convert data from a network service communication to produce converted data, and to include the converted data in output parsed personal assistant data. For example, parser 121 may convert the data of GROUP 1 and GROUP 2, above, using the above service translation information, to generate converted data and to include the converted data in parsed personal assistant data, to thereby produce the below parsed personal assistant data including converted data:

```
GROUP 1 race and run and event [La Jolla Half Marathon]
event date [2009-04-26]
GROUP 2 race and run and event [La Jolla Shores 5k]
event date [2009-04-26]
```

Parsing techniques in particular implementations may use service translation data that is configured according to any convention and may apply service translation data to convert data from network service communications according any of a wide variety of techniques as may be developed for particular implementations. As noted above, parser 121 may be configured to store parsed data, including converted data, in context database 123 and/or to supply parsed data to classifier 122 for further processing.

Furthermore, with regard to lookup of service translation data, parsing techniques in particular implementations may look up service translation information in a network service library using any information or lookup techniques, as will be appreciated. In some embodiments, personal assistant 120 may be configured to maintain a network service library including service translation information for multiple network services, for use in identifying service translation information. Personal assistant 120 may for example periodically download network service library information from a central repository made available via network 180. Parser 121 may be configured to call the network service library maintained by personal assistant 120 to retrieve service translation information. Alternatively, parser 121 may be configured to connect to a network service, which may be available via network 180, to retrieve service translation information for a network service corresponding to a received copy of a network service communication.

Classifier 122 may be configured to classify parser 121 outputs in context database 123. In some embodiments, classifier 122 may adjust relative weights of relationships between the parsed personal assistant data stored in the personal assistant context database. For example, the weights of relationships between parsed personal assistant data extracted from network service communications may be relative to other relationships in context database 123.

Classifier 122 may, for example, classify parsed personal assistant data such as the following:

```
GROUP 1 race and run and event [La Jolla Half Marathon]
event date [2009-04-26]
GROUP 2 race and run and event [La Jolla Shores 5k]
event date [2009-04-26]
```

In some example embodiments, classifier 122 may classify the above parsed personal assistant data by increasing relationship weights between each of the terms, regardless of group, in the parsed personal assistant data by one (1). In some embodiments, classifier 122 may furthermore increase relationship weights between terms within each group data by an additional one (1). In some embodiments, classifier 122 may furthermore increase relationship weights between terms on each line of the above parsed personal assistant data by an additional one (1). Thus, for example, a relationship weight between each of the terms race, run, and event and "La Jolla Half Marathon" may be increased by 1 because these terms are in the parsed personal assistant data. The relationship weights may be further increased by 1 because the terms are both in group 1. The relationship weights may be further increased by 1 because the terms are both in the first line of group 1. In such an example, the total increase in relationship weight applied by classifier 122 between each of the terms race, run, and event and "La Jolla Half Marathon" in context database 123 may, therefore, be three 3. Meanwhile, relationship weights between terms not included in the above parsed personal assistant data, such as between the terms race, run, and event and some other term such as "Washington, D.C.", or between "Washington, D.C." and some other term such as "restaurant", may remain unaffected. As a result, weights of relationships between terms in parsed personal assistant data are increased relative to weights of relationships between other data in context database.

It will be appreciated that the above example classification is one of many approaches that may be applied to classify data. Any classification techniques that may be currently available or which may be developed in the future may be applied in particular implementations of this disclosure. In some embodiments, classifier 122 may be configured to adjust relationship weights in a time dependent manner, e.g., based on age of data, to allow decay of relationship weights over time. For example, classifier 122 may decrease relationship weights between the terms race, run, and event and "La Jolla Half Marathon" in context database 123 in the absence of further adjustment of such weights, or in the absence of modification or refresh of data in context database 123, in response to the elapse of one or more predetermined periods of time.

In some embodiments, classifier 122 and context database 123, or portions thereof, and/or portions of user interaction engine 124 may be cloud-based. For example, personal assistant 120 may be configured to access a personal assistant service via network 180 to maintain context database 123 and/or to configure personal assistant user interactions.

It will be appreciated that the personal assistant context building technologies described herein may be implemented in any computing devices, including but not limited to mobile devices. The mobile device context is used in FIG. 1 and throughout this disclosure as an example, however, those of skill in the art will appreciate that the technologies described herein may be readily adapted for incorporation in other devices, such as personal computers including desktops and laptops, onboard vehicle computers, or other computing devices equipped with personal assistants. Furthermore, it will be appreciated that some embodiments may be distributed across multiple computing devices, e.g., by collecting context information at one or more first devices, and applying the context information in personal assistant context databases accessed from any of the first devices and/or from one or more second devices.

Figure 2:
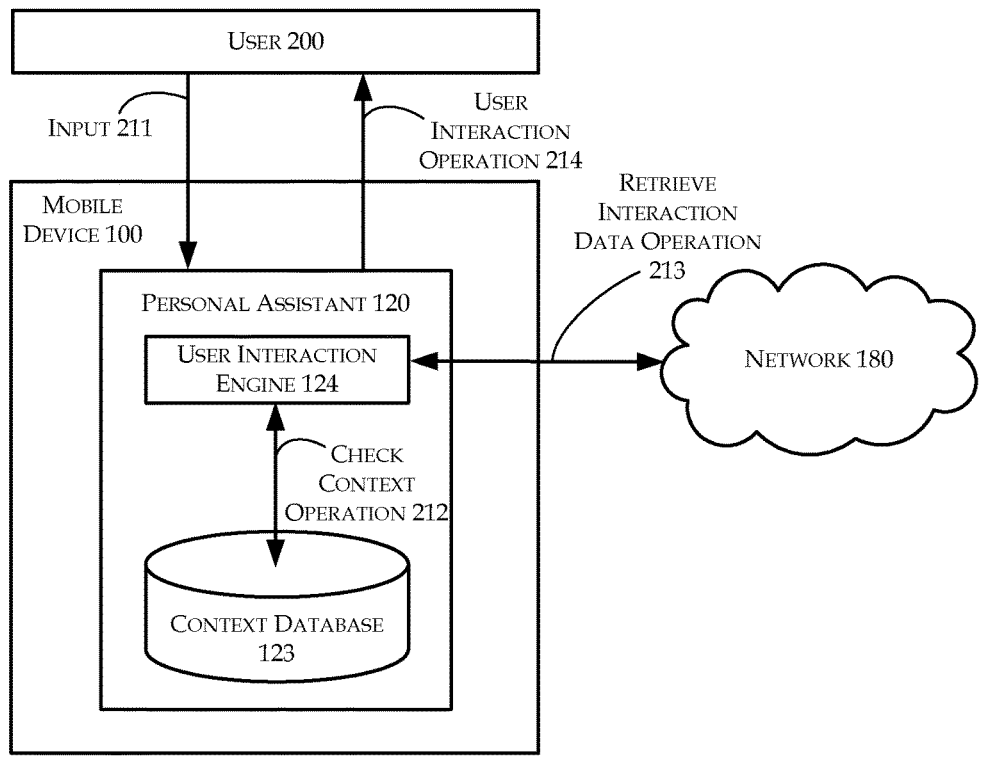
FIG. 2 is a block diagram illustrating an example computing device configured to perform personal assistant user interaction operations.

FIG. 2 is a block diagram illustrating an example computing device configured to perform personal assistant user interaction operations, arranged in accordance with at least some embodiments of the present disclosure. FIG. 2 includes a user 200, mobile device 100, and network 180. Mobile device 100 includes personal assistant 120, which includes context database 123 and user interaction engine 124 as previously illustrated in FIG. 1. Context database 123 may be configured according to the techniques described above with reference to FIG. 1. FIG. 2 omits parser 121, classifier 122 and various other elements of FIG. 1 to simplify the illustration because the omitted elements are not needed for the description of FIG. 2.

FIG. 2 illustrates an input 211 from user 200 to personal assistant 120. FIG. 2 also illustrates user interaction engine 124 in personal assistant 120 engaging a check context operation 212 with context database 123. User interaction engine 124 in personal assistant 120 may also engage a retrieve interaction data operation 213, e.g., by retrieving data from network 180, wherein the data to be retrieved from network 180 is determined at least in part from check context operation 212. Personal assistant 120 may configure and perform a user interaction operation 214, wherein the user interaction operation 214 is configured at least in part from context determined pursuant to check context operation 212, e.g., wherein interaction data retrieved from network 180 and supplied to user 200 in user interaction operation 214 is determined at least in part using context information determined pursuant to check context operation 212.

Personal assistant 120 may be configured to receive input 211, also referred to herein as an automated personal assistant user input. Input 211 may, for example, be forwarded to personal assistant 120 by a mobile device operating system, or user 200 may activate personal assistant 120 to give personal assistant 120 control of mobile device 100, along with any inputs received by mobile device 100, prior to user 200 supplying input 211 to mobile device 100.

In some embodiments, personal assistant 120 may supply input 211 to user interaction engine 124 to configure an appropriate user interaction operation 214 responsive to input 211. User interaction engine 124 may configure and perform user interaction operation 214 alongside any number of additional operations. For example, in response to a voice command such as "call Bob", user interaction engine 124 may look up Bob's number in an address book, display a telephone interface with Bob's number, play a voice output saying "calling Bob", and initiate a telephone call to Bob.

In response to a voice command such as "Where is the starting line for the race?" user interaction engine 124 may be configured to determine context information in connection with configuring user interaction operation 214. User interaction engine 124 may determine, using received user input 211 and context database 123, strong weighted relationships between received user input 211 and other personal assistant data in the personal assistant context database 123.

For example, user interaction engine 124 may determine a strong weighted relationship exists between "race" and "La Jolla half-marathon".

After context information is determined, user interaction engine 124 may be adapted to use determined context information to configure user interaction operation 214. For example, in some embodiments, user interaction engine 124 may perform a retrieve interaction data operation 213, such as an internet search, for "location starting line La Jolla half marathon". User interaction engine 124 may configure user interaction operation 214 for example as a search result display, a map interface display, or a voice output, comprising information gathered in retrieve interaction data operation 213.

In another example, user interaction engine 124 may determine, using received user input 211 and context database 123, strong weighted relationships between received user input 211 and both of "La Jolla half-marathon" and "La Jolla Shores 5 k". User interaction engine 124 may configure user interaction operation 214 as a question to user 200, such as "Do you want the La Jolla half-marathon, or the La Jolla Shores 5 k?" It will be appreciated that many different types of user interaction operations may be configured, any of which may usefully employ data from context database 123 which data may be configured with network service communication information as described herein.

Figure 3:
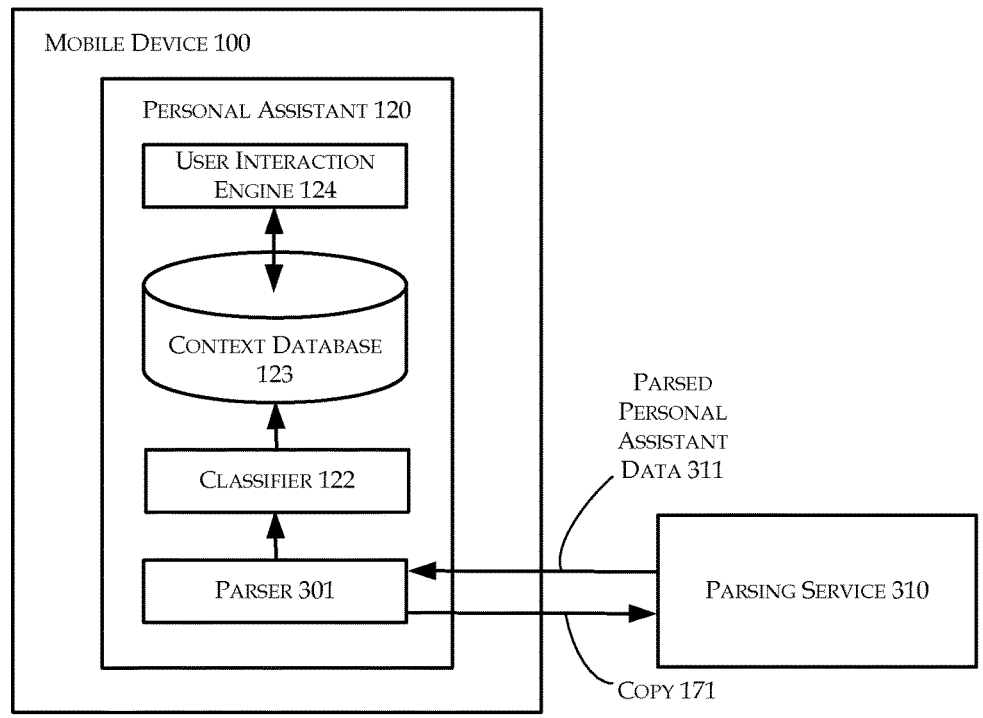
FIG. 3 is a block diagram illustrating an example computing device configured to access a parsing service for personal assistant context building.

FIG. 3 is a block diagram illustrating an example computing device configured to access a parsing service for personal assistant context building, arranged in accordance with at least some embodiments of the present disclosure. FIG. 3 includes mobile device 100 and a parsing service 310. Mobile device 100 includes personal assistant 120, and personal assistant 120 includes parser 301, classifier 122, context database 123, and user interaction engine 124 as illustrated in FIG. 1.

FIG. 3 illustrates transmission of copy 171 from parser 301 to parsing service 310. Parsing service 310 may be configured to parse copy 171 to generate parsed personal assistant data 311. FIG. 2 illustrates return of parsed personal assistant data 311 from parsing service 310 to parser 301. As illustrated in FIG. 1, an arrow from parser 301 to classifier 122 indicates consumption by classifier 122 of data output from parser 301. An arrow from classifier 122 to context database 123 indicates insertion of data output from classifier 122 into context database 123. A two-way arrow between user interaction engine 124 and classifier 122 indicates lookups by user interaction engine 124 in context database 123, e.g., to determine context of received user inputs.

In FIG. 3, parser 301 may be configured to forward copies of network service communications, such as copy 171, to parsing service 310. Parsing service 310 may comprise a network service available via a network such as network 180. Parsing service 310 may perform some or all parsing operations, such as those described herein in connection with parser 121, to produce parsed personal assistant data 311. Parsing service 310 may return parsed personal assistant data 311 to parser 301. Parser 301 may be configured to receive parsed personal assistant data 311. In response to receiving parsed personal assistant data 311, parser 301 may be configured to store parsed personal assistant data 311 in context database 123 and activate classifier 122 for classification of parsed personal assistant data 311 within context database 123, or otherwise parser 301 may be configured to provide parsed personal assistant data 311 to classifier 122 for further processing and storage in context database 123.

In some embodiments, parser 301 may be configured to forward some, but not all, copies of network service communications to parsing service 310. Parser 301 may, for example, select network service communications corresponding to select network APIs for forwarding to parsing service 310. Parser 301 may send different types of network service communications to different parsing services, or parser 301 may handle some network service communications locally, while forwarding others to parsing services.

In some embodiments, operations described above in connection with parser 301 forwarding copy 171 and receiving parsed personal assistant data 311 may be performed by personal assistant 120 or a component thereof, or by another process at mobile device 100, as will be appreciated.

In some embodiments, parser 301 may be configured to perform some degree of pre-processing of copy 171 prior to sending copy 171 to parsing service 310. For example, parser 301 may perform some of the parsing operations described above in connection with parser 121, and then forward pre-processed data to parsing service 310. In such embodiments, copy 171 sent to parsing service 310 may be other than a true or exact copy of a network service communication, as will be appreciated. Similarly, parser 301 may be configured to perform some degree of post-processing on parsed personal assistant data 311 received from parsing service 310.

In some embodiments, parsing service 310 may be configured to perform parsing as well as classification functions. For example, parsing service 310 may parse copy 171 to produce parsed personal assistant data 311, and parsing service 310 may also classify parsed personal assistant data 311 by assigning relationship weights to data included in parsed personal assistant data 311. Assigned relationship weights may, for example, be used by parser 301 to adjust relationship weights of parsed personal assistant data 311 when storing parsed personal assistant data 311 in context database 123. In such embodiments, classifier 122 may be eliminated or may have reduced classification responsibility in connection with parsed personal assistant data 311.

Figure 4:
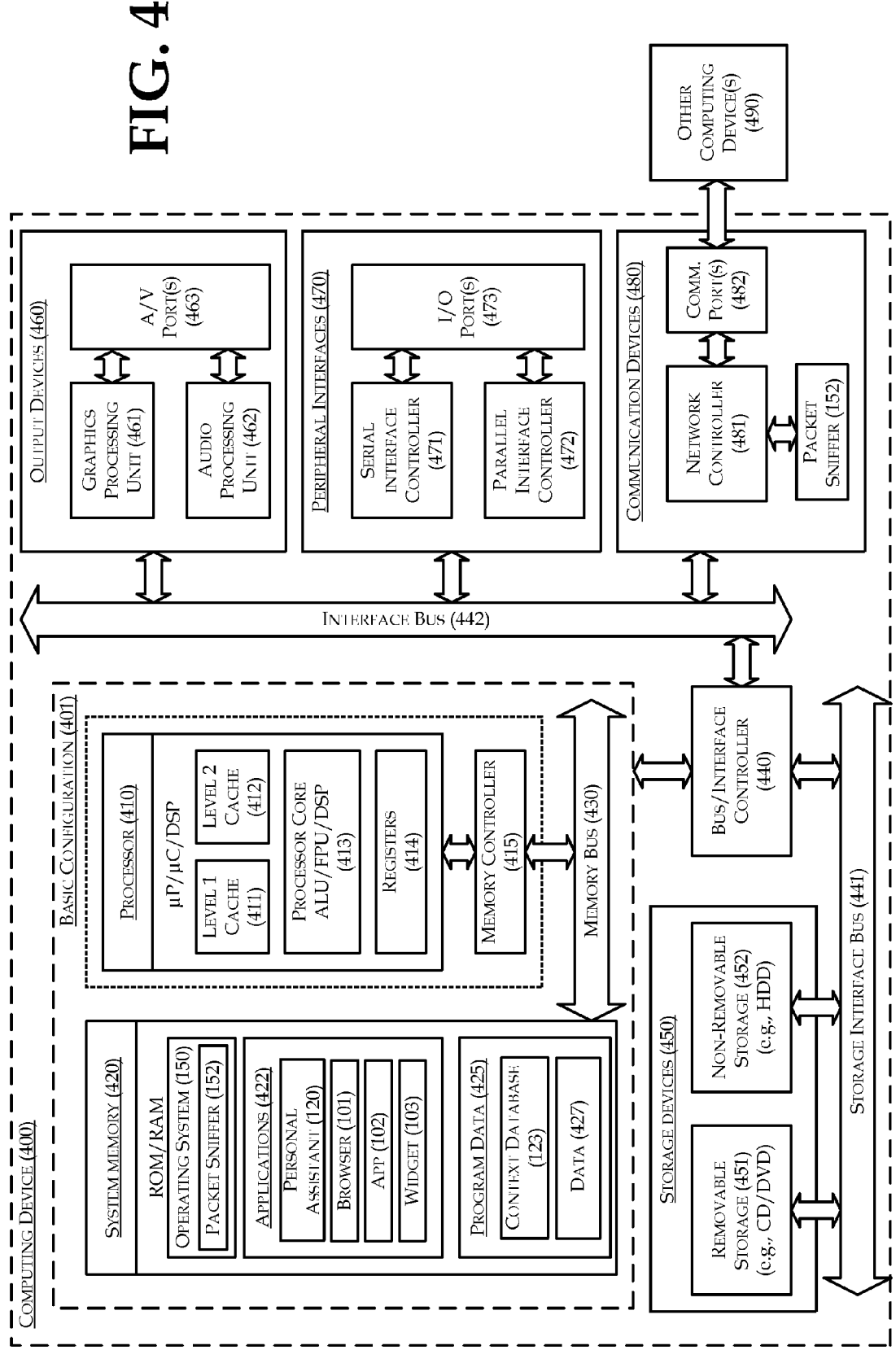
FIG. 4 is a block diagram of a computing device as one example of a computing device configured for personal assistant context building.

FIG. 4 is a block diagram of a computing device as one example of a mobile device configured for personal assistant context building, arranged in accordance with at least some embodiments of the present disclosure. In a very basic configuration 401, computing device 400 may include one or more processors 410 and system memory 420. A memory bus 430 may be used for communicating between the processor 410 and the system memory 420.

Depending on the desired configuration, processor 410 may be of any type including but not limited to a microprocessor (μP), a microcontroller (μC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP core), or any combination thereof. A memory controller 415 may also be used with the processor 410, or in some implementations, the memory controller 415 may be an internal part of the processor 410.

Depending on the desired configuration, the system memory 420 may be of any type including but not limited to volatile memory (such as RAM), non-volatile memory (such as ROM, flash memory, etc.), or any combination thereof. System memory 420 typically includes an operating system 150, one or more applications 422, and program data 425. In some embodiments, operating system 150 may comprise a virtual machine that is managed by a Virtual Machine Manager (VMM). Operating system 150 may comprise a packet sniffer 152, as described in connection with FIG. 1. In some embodiments, operating system 150 may be configured to load packet sniffer 152 among communication devices 480, or to otherwise configure packet sniffer 152 to interact with communication devices 480. In some embodiments, operating system 150 may also comprise personal assistant module(s) 120.

Applications 422 may include, for example, personal assistant module(s) 120, browser module(s) 101, App module(s) 102, and/or widget module(s) 103. Program data 425 may include context database 123 and/or data 427 that may be used by packet sniffer 152, personal assistant module(s) 120, browser module(s) 101, App module(s) 102, and/or widget module(s) 103, respectively.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disc drives such as compact disc (CD) drives or digital versatile disc (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 411, level 2 cache 412, system memory 420, removable storage 451, and non-removable storage devices 452 are all examples of computer storage media. Computer storage media includes, but is not limited to, RAM, ROM, EEPROM, flash memory or other memory technology, CD-ROM, digital versatile discs (DVDs) or other optical storage, magnetic cassettes, magnetic tape, magnetic disk storage or other magnetic storage devices, or any other medium that may be used to store the desired information and that may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 473. Other conventional I/O devices may be connected as well such as a mouse, keyboard, and so forth. An example communications device 480 may include a network controller 481, which may be arranged to facilitate communications with one or more other computing devices 490 over a network communication via one or more communication ports 482. In some embodiments, communications device 480 may also be configured to include packet sniffer 152, or otherwise to interoperate with packet sniffer in a network layer of operating system 150 as described herein.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 400 may be implemented as a smart phone device or a tablet computing device. Computing device 400 may also be implemented as a personal or business use computer including both laptop computer and non-laptop computer configurations. Computing device 400 may also be implemented as a computing device in a vehicle, a home or building security system, or any other device in which an intelligent personal assistant 120 may be deployed.

Figure 5:
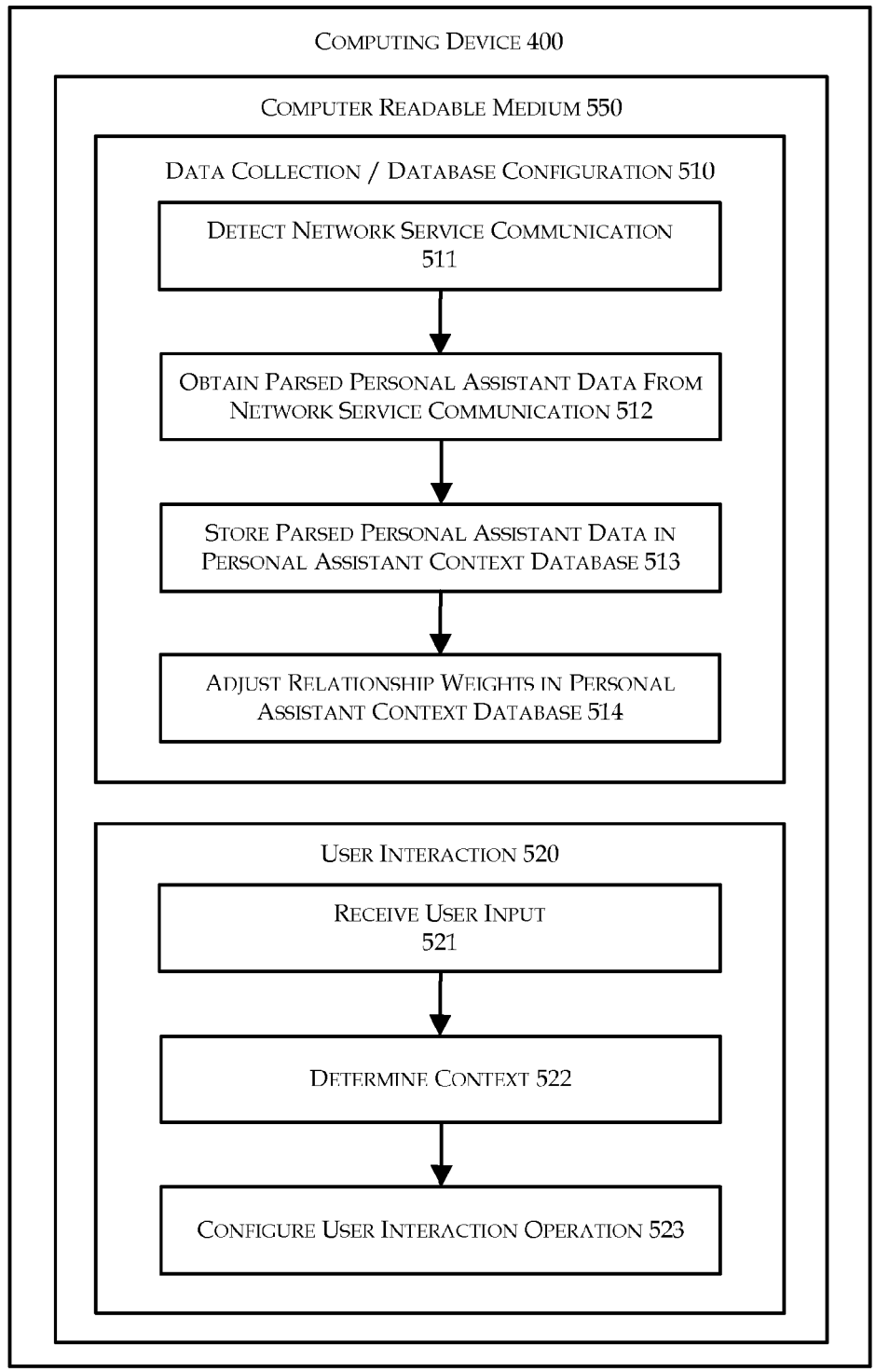
FIG. 5 is a flow diagram illustrating example methods for personal assistant context building.

FIG. 5 is a flow diagram illustrating example methods for personal assistant context building, arranged in accordance with at least some embodiments of the present disclosure. The example flow diagram may include one or more operations/modules as illustrated by blocks 510-514 and 520-523, which represent operations as may be performed in a method, functional modules in a computing device 400, and/or instructions as may be recorded on a computer readable medium 550.

In FIG. 5, blocks 510-514 and 520-523 are illustrated as including blocks being performed sequentially, e.g., with blocks 511-514 and 521-523 being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which computing device 400 may perform personal assistant methods, including a data collection/database configuration stage and/or a user interaction stage. A "Data Collection/Database Configuration" block 510 in computing device 400 may perform operations pursuant to the data collection/database configuration stage. Block 510 may configure a personal assistant context database with context information gathered from network service communications. In some embodiments, block 510 may be carried out by an operating system including a packet sniffer, along with components such as a parser, a classifier, and a personal assistant context database in a personal assistant, as described herein. The personal assistant may also make use of a remote parsing service as described herein. Block 510 may include blocks 511-514.

At a "Detect Network Service Communication" block 511, computing device 400 may detect network service communications, e.g., by detecting transmissions of network service requests and/or network service responses between apps and/or other programs at computing device 400 and a network. Block 511 may for example include detecting network traffic, such as API calls and responses, comprising http post and get calls with command and option fields, API key fields, API destinations, and/or any other property that distinguishes the types of network service communications that are desired for use in building personal assistant context information. Block 511 may be followed by block 512.

At an "Obtain Parsed Personal Assistant Data From Network Service Communication" block 512, computing device 400 may obtain parsed personal assistant data extracted from a network service communication detected pursuant to block 511. Several configuration options for block 512 are disclosed herein.

In some embodiments, block 512 may comprise parsing a network service communication locally by the mobile device. In some embodiments, block 512 may comprise forwarding by the mobile device a copy of a network service communication to a remote parsing service, and receiving parsed personal assistant data returned from the remote parsing service. In some embodiments, a combination of these approaches may be implemented, e.g., by performing some degree of local parsing, and requesting a parsing service to perform some degree of additional parsing.

Furthermore, block 512 may employ varying degrees of parsing sophistication. In relatively simple embodiments, block 512 may employ basic parsing rules to remove data from network service communications that may be easily identified as unnecessary or undesirable as context information. In more sophisticated embodiments, additional parsing rules may be used for example to group data from network service communications and/or convert data to increase its usefulness as context information. Embodiments of block 512 that convert network service communication data are described further in connection with FIG. 6. Block 512 may be followed by block 513.

At a "Store Parsed Personal Assistant Data in Personal Assistant Context Database" block 513, computing device 400 may store at least a portion of parsed personal assistant data in a personal assistant context database. Those of skill in the art will appreciate that there is flexibility in decisions of when to store data in the personal assistant context database. In some embodiments, parsed personal assistant data obtained at block 512 may be stored in the personal assistant context database, and the stored data may be subsequently adjusted pursuant to block 514, as illustrated in FIG. 5. In some embodiments, parsed personal assistant data obtained at block 512 may be temporarily stored in a memory location other than the personal assistant context database for manipulation pursuant to block 514, and block 513 may be performed after block 514. Also, in embodiments in which the personal assistant context database is implemented as a cloud-based context database, block 512 may be configured to access a network service, e.g., by sending parsed personal assistant data to the network service for inclusion in the cloud-based context database. Block 513 may be followed by block 514.

At an "Adjust Relationship Weights in Personal Assistant Context Database" block 514, computing device 400 may adjust relative weights of relationships between the parsed personal assistant data stored in the personal assistant context database. Block 514 may for example strengthen weights of relationships between the parsed personal assistant data extracted from the network service communication detected at block 511, relative to other relationships between personal assistant data in the personal assistant context database. In some embodiments, block 514 may be performed by computing device 400 interacting with a network server implementing a cloud-based context database.

At a "User Interaction" block 520, computing device 400 may perform a user interaction stage of methods according to FIG. 5. Computing device 400 may be configured to use a personal assistant context database that is configured according to the data collection/database configuration stage implemented at block 510 to configure personal assistant user interaction operations at block 520. In some embodiments, block 520 may be carried out by a personal assistant, e.g., by a user interaction engine and a personal assistant context database in a personal assistant as described herein. In some embodiments, block 520 may include network accesses, e.g., by the user interaction engine to access a cloud-based context database and/or to retrieve interaction data as described herein. Block 520 may be performed before, after, or concurrently with block 510. Block 520 may include blocks 521-523.

In a "Receive User Input" block 521, computing device 400 may receive an automated personal assistant user input. Example inputs may include, for example, voice or other audio inputs received via a microphone, text inputs received via a keyboard, and/or photo or video inputs received via a camera. Received inputs may comprise, or may be interpreted as, commands to the personal assistant. For example, in some embodiments, received inputs may comprise voice commands that engage the personal assistant. In some embodiments, users may select a button or other control to engage the personal assistant in advance of providing input. Block 521 may be followed by block 522.

At a "Determine Context" block 522, computing device 400 may determine context information from the personal assistant context database. For example, computing device 400 may determine strong weighted relationships, in the personal assistant context database, between the user input received at block 521 and other personal assistant data in the personal assistant context database. Personal assistant data items having strong weighted relationships with the received input may be used to ascertain likely meaning of the user input received at block 521, or to supplement the user input, e.g., in the configuration of search terms for an internet search, or for example to configure a voice response in which the user is requested to verify or select between meanings of the user input. In some embodiments, computing device 400 may implement block 522 at least in part by sending user input received at block 521 to a cloud-based context database as described herein. Block 522 may be followed by block 523.

At a "Configure User Interaction Operation" block 523, computing device 400 may configure an automated personal assistant user interaction operation using personal assistant data in the personal assistant context database having the strong weighted relationships with the user input, as determined at block 522. In some embodiments, computing device 400 may configure the automated personal assistant user interaction operation using data received from a cloud-based context database, e.g., in response to a call to the cloud-based context database made at block 522.

Figure 6:
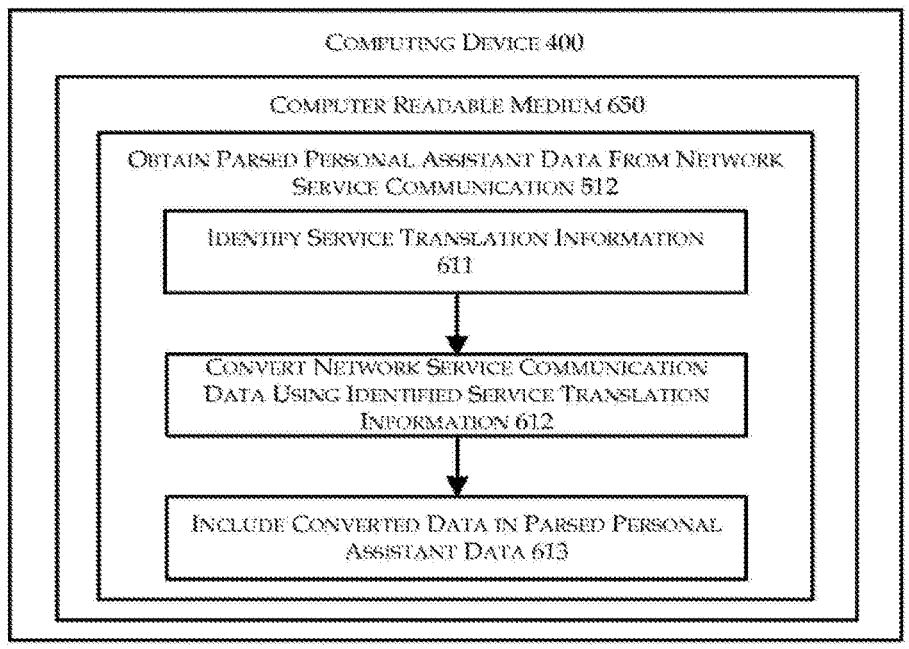
FIG. 6 is a flow diagram illustrating example methods for parsing network service communications.

FIG. 6 is a flow diagram illustrating example methods for parsing network service communications, arranged in accordance with at least some embodiments of the present disclosure. The example flow diagram may include one or more operations/modules as illustrated by blocks 512 and 611-613, which represent operations as may be performed in a method, functional modules in a computing device 400, and/or instructions as may be recorded on a computer readable medium 650.

In FIG. 6, blocks 512 and 611-613 are illustrated as including blocks being performed sequentially, e.g., with blocks 611-613 being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates an example method by which computing device 400 may convert network service communication data, e.g., in connection with parsing the data as disclosed herein. At an "Obtain Parsed Personal Assistant Data from Network Service Communication" block 512, computing device 400 may perform any of a variety of parsing operations as disclosed herein. For example, computing device 400 may optionally apply parsing rules to remove unnecessary data from network service communications and/or to group certain data in network service communications, in addition to performing blocks 611-613. Block 512 may include blocks 611-613.

At an "Identify Service Translation Information" block 611, computing device 400 may identify service translation information (such as API translation information) for a network service (such as a network API) corresponding to a network service communication (such as an API call or response) detected for example at block 511 in FIG. 5. Computing device 400 may use information contained in the network service communication to lookup a corresponding network service, and service translation information for the corresponding network service, in a network service library. Block 611 may access the network service library locally at device 400, when available, or block 611 may access the network service library via a network. Block 611 may be followed by block 612.

At a "Convert Network Service Communication Data Using Identified Service Translation Information" block 612, computing device 400 may convert data from the network service communication detected at block 511 in FIG. 5, using the service translation information identified at block 611. Block 612 may generally identify terms within identified service translation information that have a corresponding translation output or rule. Block 612 may look up each identified term within network service communication data, and block 612 may apply the translation outputs and rules from the identified service translation information to generate converted data. Block 612 may be followed by block 613.

At an "Include Converted Data in Parsed Personal Assistant Data" block 613, computing device 400 may include converted data generated at block 612 in parsed personal assistant data for the network service communication detected at block 511 in FIG. 5. In some embodiments, blocks 612 and 613 may be combined for example by writing the converted data directly into parsed personal assistant data at block 612.

Figure 7:
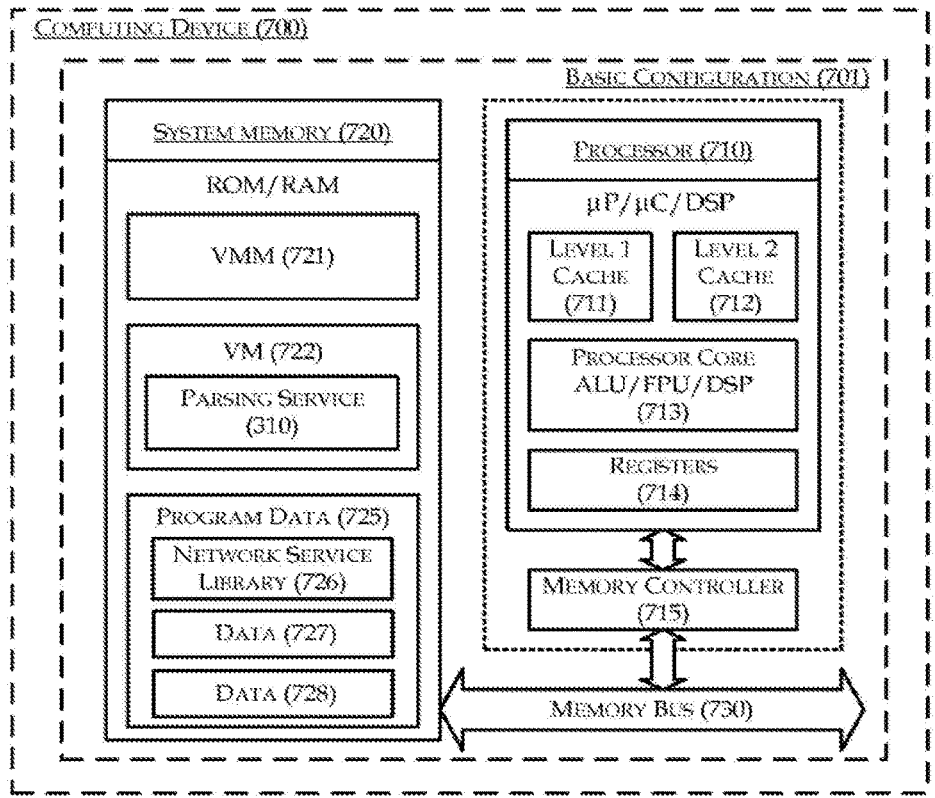
FIG. 7 is a block diagram of a computing device as one example of network server configured to provide a parsing service.

FIG. 7 is a block diagram of a computing device as one example of network server configured to provide a parsing service, arranged in accordance with at least some embodiments of the present disclosure. In a basic configuration 701, computing device 700 may include one or more processors 710 and a system memory 720. A memory bus 730 may be used for communicating between processor 710 and system memory 720. Depending on the desired configuration, processor 710 may be of any type including but not limited to a microprocessor (µP), a microcontroller (µC), a digital signal processor (DSP), or any combination thereof. Processor 710 may include one or more levels of caching, such as a level one cache 711 and a level two cache 712, a processor core 713, and registers 714. The processor core 713 may include an arithmetic logic unit (ALU), a floating point unit (FPU), a digital signal processing core (DSP core), or any combination thereof. A memory controller 715 may also be used with the processor 710, or in some implementations, the memory controller 715 may be an internal part of the processor 710.

Depending on the desired configuration, the system memory 720 may be of any type including but not limited to volatile memory (such as RAM), non-volatile memory (such as ROM, flash memory, etc.), or any combination thereof. System memory 720 typically includes either a single operating system (not illustrated) or a Virtual Machine Manager (VMM) 721 that can manage operations of multiple Virtual Machines (VMs), such as VM 722. Each VM may comprise different applications and program data. For example, VM 722 may comprise a parsing service 310, and program data 725. Program data 725 may include network service library 726 and/or data 727 or 728 that may be used by parsing service 310.

Devices according to FIG. 7 may generally comprise additional elements described above in connection with FIG. 4, which are not included in FIG. 7 to avoid redundancy of description. Computing device 700 may be implemented as a server in a data center or elsewhere, or as any computer with sufficient processing power, fault tolerance, and continuous availability to provide a reliable service to mobile devices such as mobile device 100 as illustrated in FIG. 3.

Figure 8:
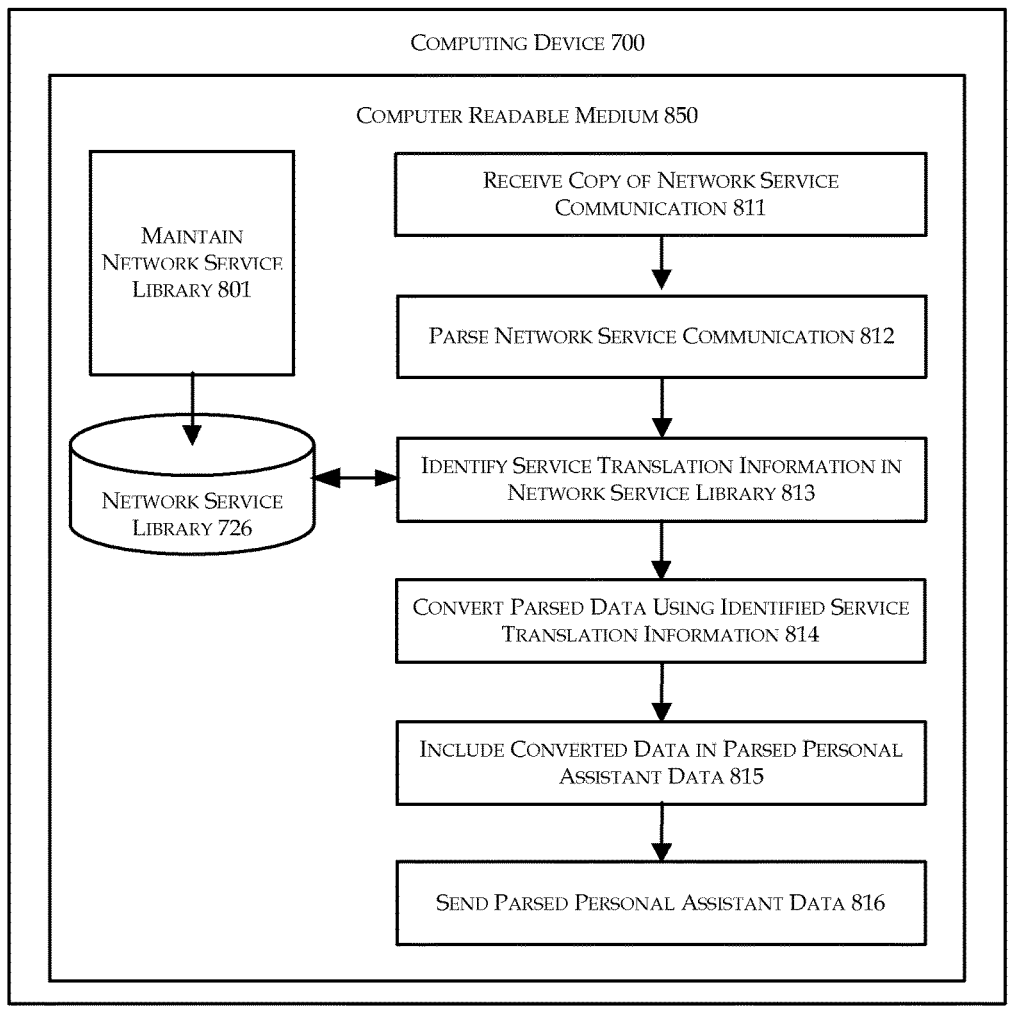
FIG. 8 is a flow diagram illustrating example methods for providing a parsing service; all arranged in accordance with at least some embodiments of the present disclosure.

FIG. 8 is a flow diagram illustrating example methods for providing a parsing service, arranged in accordance with at least some embodiments of the present disclosure. The example flow diagram may include one or more operations/modules as illustrated by blocks 801 and 811-816, which represent operations as may be performed in a method, functional modules in a computing device 700, and/or instructions as may be recorded on a computer readable medium 850. Blocks 801 and 811-816 may interact with network service library 726 as illustrated.

In FIG. 8, blocks 811-816 are illustrated as being performed sequentially, e.g., with block 811 being performed first and block 816 being performed last, while block 801 may be performed concurrently with any of blocks 811-816. It will be appreciated however that these blocks may be re-arranged as convenient to suit particular embodiments and that blocks 811-816 or portions thereof may be performed concurrently in some embodiments, or block 801 may be performed sequentially among blocks 811-816. It will also be appreciated that in some examples various blocks may be eliminated, divided into additional blocks, and/or combined with other blocks.

FIG. 8 illustrates an example method by which computing device 700 may provide a parsing service, e.g., under the control of parsing service 310. For example, with reference to FIG. 3, computing device 700 may provide parsing service 310 which may be accessible by computing devices, such as mobile device 100, for use in parsing network service communications. Parsing services may range from basic to powerful, described herein, and may generally include any of the features described herein in connection with parser 121. Basic parsing services may include, e.g., blocks 811, 812, and 816, without the various other blocks of FIG. 8. More powerful parsing services may employ blocks 801 and/or any of the various other blocks of FIG. 8 as desired for particular implementations.

At a "Maintain Network Service Library" block 801, computing device 700 may maintain network service library 726, network service library 726 including service translation information for multiple network services. Block 801 may for example periodically check published network APIs for updates. Updates may be copied into network service library 726, and translation tables comprising service translation information may be updated automatically when possible. Service translation information may be updated or otherwise configured manually, that is, by a human administrator in some embodiments. Updating service translation information may generally comprise identifying meanings behind terms used for particular network services, and providing translations including terms that may be more useful as context information. For example, if an API is updated to use the abbreviation "loc" instead of "location", service translation information may be updated to convert "loc" into "location" for that API. In some embodiments, updating service translation information may comprise including thesaurus-type information as translation terms. For example, when an API uses the term "location", translation terms may provide additional terms such as "place", "destination", "where", etc., for use generated converted data outputs. Block 801 may be performed concurrently with any of blocks 811-816.

At a "Receive Copy of Network Service Communication" block 811, computing device 700 may receive from a computing device, such as mobile device 100, a copy of a network service communication. The received copy may include a network service request made by the mobile device and/or or a network service response received by the mobile device. In some embodiments, the received copy may also have been subject to some amount of pre-processing as described herein. Block 811 may be followed by block 812.

At a "Parse Network Service Communication" block 812, computing device 700 may parse the copy of the network service communication received at block 811 to generate parsed personal assistant data. Computing device 700 may, for example, perform any of the parsing operations disclosed herein, e.g., the parsing operations described in connection with parser 121, such as removing data and grouping data, to produce parsed personal assistant data. Block 812 may be followed by block 813.

In some embodiments, parsing services provided by computing device 700 may parse data without performing any classification of the parsed person assistant data, and any classification may be performed for example at the mobile device upon return of parsed person assistant data to the mobile device. In some embodiments, parsing services provided by computing device 700 may perform some degree of classification of parsed personal assistant data prior to sending parsed person assistant data to a mobile device at block 816. Classification may be incorporated into block 812 or may be performed in a separate classification block as appropriate.

Classification at computing device 700 may generally comprise operations similar to those described herein in connection with classifier 122. In some embodiments, computing device 700 may not have access to context databases such as context database 123, and so classification at computing device 700 may be limited to parsed personal assistant data generated at computing device 700. Classification at computing device 700 may be configured to determine relative weights of relationships between the parsed personal assistant data, and to include the relative weights of relationships in the parsed personal assistant data. Classification information may then be merged into context databases along with the parsed personal assistant data that may be sent to mobile devices at block 816. For example, classification weights included in parsed personal assistant data at computing device 700 may be treated by mobile devices as "deltas" or amounts by which relationship weights existing within context databases may be changed by mobile devices.

Blocks 813-815 are illustrated separately from block 812 to provide additional detail for the operations of blocks 813-815. In some embodiments, blocks 813-815, or portions thereof, may be included in block 812. At an "Identify Service Translation Information in Network Service Library" block 813, computing device 700 may identify service translation information in network service library 726 for a network service corresponding to the copy of the network service communication received at block 811. In some embodiments, block 813 may comprise operations, by computing device 700, similar to operations disclosed in connection with block 611 in FIG. 6. Block 813 may be followed by block 814.

At a "Convert Parsed Data Using Identified Service Translation Information" block 814, computing device 700 may convert parsed personal assistant data generated at block 812 using the service translation information identified at block 813, to produce converted data. In some embodiments, block 814 may comprise operations, by computing device 700, similar to operations disclosed in connection with block 612 in FIG. 6. Block 814 may be followed by block 815.

At an "Include Converted Data in Parsed Personal Assistant Data" block 815, computing device 700 may include the converted data produced at block 814 in the parsed personal assistant data generated at block 812. In some embodiments, block 815 may comprise operations, by computing device 700, similar to operations disclosed in connection with block 613 in FIG. 6. Block 815 may be followed by block 816.

At a "Send Parsed Personal Assistant Data" block 816, computing device 700 may send the parsed personal assistant data generated by blocks 812 and optionally including converted data included at block 815, to the mobile device from which the copy of a network service communication was received at block 811. In some embodiments, computing device 700 may send the parsed personal assistant data generated by blocks 812 and optionally including converted data included at block 815, to a cloud-based context database accessible by the mobile device. The cloud-based context database may be implemented at computing device 700 or at a separate network server.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disc (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated"

such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to provide a parsing service, the method comprising:
   receiving, by a network server from a computing device, a copy of a network application programming interface (API) communication that includes one or more of a network API call made by the computing device or a network API response received by the computing device;
   parsing, by the network server, the received copy of the network API communication to generate parsed personal assistant data, wherein parsing comprises at least removing repetitive data from the received copy of the network API communication;
   maintaining, by the network server, a network service library that includes service translation information for a plurality of network APIs;
   identifying, by the network server, the service translation information in the network service library for a network API that corresponds to the received copy of the network API communication;
   converting, by the network server, the parsed personal assistant data using the identified service translation information, so as to produce converted data, wherein the identified service translation information comprises:
   terms used in connection with the network API, and corresponding translation outputs;
   including, by the network server, the converted data in the parsed personal assistant data; and
   sending, by the network server, the parsed personal assistant data that includes the converted data to the computing device.

2. The method of claim 1, wherein receiving the copy of the network API communication comprises receiving a copy of one or more of an extensible markup language (XML) communication or a javascript object notation (JSON) communication.

3. The method of claim 1, further comprising:
   determining, by the network server, relative weights of relationships between the parsed personal assistant data; and
   including the relative weights of relationships in the parsed personal assistant data.

4. The method of claim 1, wherein maintaining the network service library comprises checking published network APIs for updates to the published network APIs.

5. The method of claim 4, wherein maintaining the network service library comprises including, for an update to a published network API, thesaurus information for the update to the published network API.

6. The method of claim 1, wherein the parsing the received copy of the network API communication comprises grouping portions of the received copy of the network API communication.

7. A non-transitory computer readable storage medium that includes computer executable instructions stored thereon that are executable by a processor, wherein the instructions, in response to execution by the processor, implement a parsing service, which causes the processor to perform or control performance of operations that comprise:
   identify a copy of a network application programming interface (API) communication that includes one or more of a network API request made by a computing device or a network API response received by the computing device;
   parse the identified copy of the network API communication by at least removal of repetitive data from the identified copy of the network API communication, so as to generate parsed personal assistant data;
   maintain a network service library that includes service translation information for a plurality of network APIs;
   identify the service translation information in the network service library for a network API that corresponds to the identified copy of the network API communication;
   convert the parsed personal assistant data by use of the identified service translation information, so as to produce converted data, wherein the service translation information comprises:
      terms used in connection with the network API, and corresponding translation outputs;
   include the converted data in the parsed personal assistant data; and
   send the parsed personal assistant data that includes the converted data to the computing device.

8. The non-transitory computer readable storage medium of claim 7, wherein the network API communication comprises one or more of an extensible markup language (XML) communication or a javascript object notation (JSON) communication.

9. The non-transitory computer readable storage medium of claim 7, wherein the operations further comprise:
   determine relative weights of relationships between the parsed personal assistant data; and
   include the relative weights of relationships in the parsed personal assistant data.

10. The non-transitory computer readable medium of claim 7, wherein the operations to maintain the network service library comprises at least one operation to check published network APIs for updates to the published network APIs.

11. The non-transitory computer readable medium of claim 10, wherein the operations to maintain the network service library comprises at least one operation to include, for an update to a published network API, thesaurus information for the update to the published network API.

12. The non-transitory computer readable medium of claim 7, wherein the operations to parse the identified copy of the network API communication comprises at least one operation to parse, in part by grouping portions of the identified copy of the network API communication.

13. A network server configured to provide a parsing service, the network server comprising:
   a processor;
   a memory coupled to the processor; and
   the parsing service stored in the memory and executable by the processor, wherein the parsing service is configured to:
      receive a copy of a network application programming interface (API) communication that includes one or more of a network API request made by a computing device or a network API response received by the computing device;
      parse the received copy of the network API communication by at least removal of repetitive data from the received copy of the network API communication, so as to generate parsed personal assistant data;
      maintain a network service library that includes service translation information for a plurality of network APIs;
      identify the service translation information in the network service library for a network API that corresponds to the received copy of the network API communication;
      convert the parsed personal assistant data by use of the identified service translation information, so as to produce converted data, wherein the service translation information comprises:
         terms used in connection with the network API, and corresponding translation outputs;
      include the converted data in the parsed personal assistant data; and
      send the parsed personal assistant data that includes the converted data to the computing device.

14. The network server of claim 13, wherein the network API communication comprises one or more of an extensible markup language (XML) communication or a javascript object notation (JSON) communication.

15. The network server of claim 13, wherein the parsing service is configured to determine relative weights of relationships between the parsed personal assistant data, and to include the relative weights of relationships in the parsed personal assistant data.

16. The network server of claim 13, wherein the parsing service is configured to maintain the network service library at least, in part, by checking published network APIs for updates to the published network APIs.

17. The network server of claim 16, wherein the parsing service is configured to maintain the network service library at least, in part, by including, for an update to a published network API, thesaurus information for the update to the published network API.

18. The network server of claim 13, wherein the parsing service is configured to parse the received copy of the network API communication at least, in part, by grouping portions of the received copy of the network API communication.

* * * * *

UNITED STATES PATENT AND TRADEMARK OFFICE
CERTIFICATE OF CORRECTION

PATENT NO.       : 9,772,990 B2
APPLICATION NO.  : 14/851245
DATED            : September 26, 2017
INVENTOR(S)      : Kruglick It is certified that error appears in the above-identified patent and that said Letters Patent is hereby corrected as shown below:

In the Claims

Column 36, Line 4, Claim 12, delete "in part by" and insert -- in part, by --, therefor.

Signed and Sealed this
Seventeenth Day of April, 2018

Andrei Iancu
*Director of the United States Patent and Trademark Office*